UNITED STATES PATENT OFFICE.

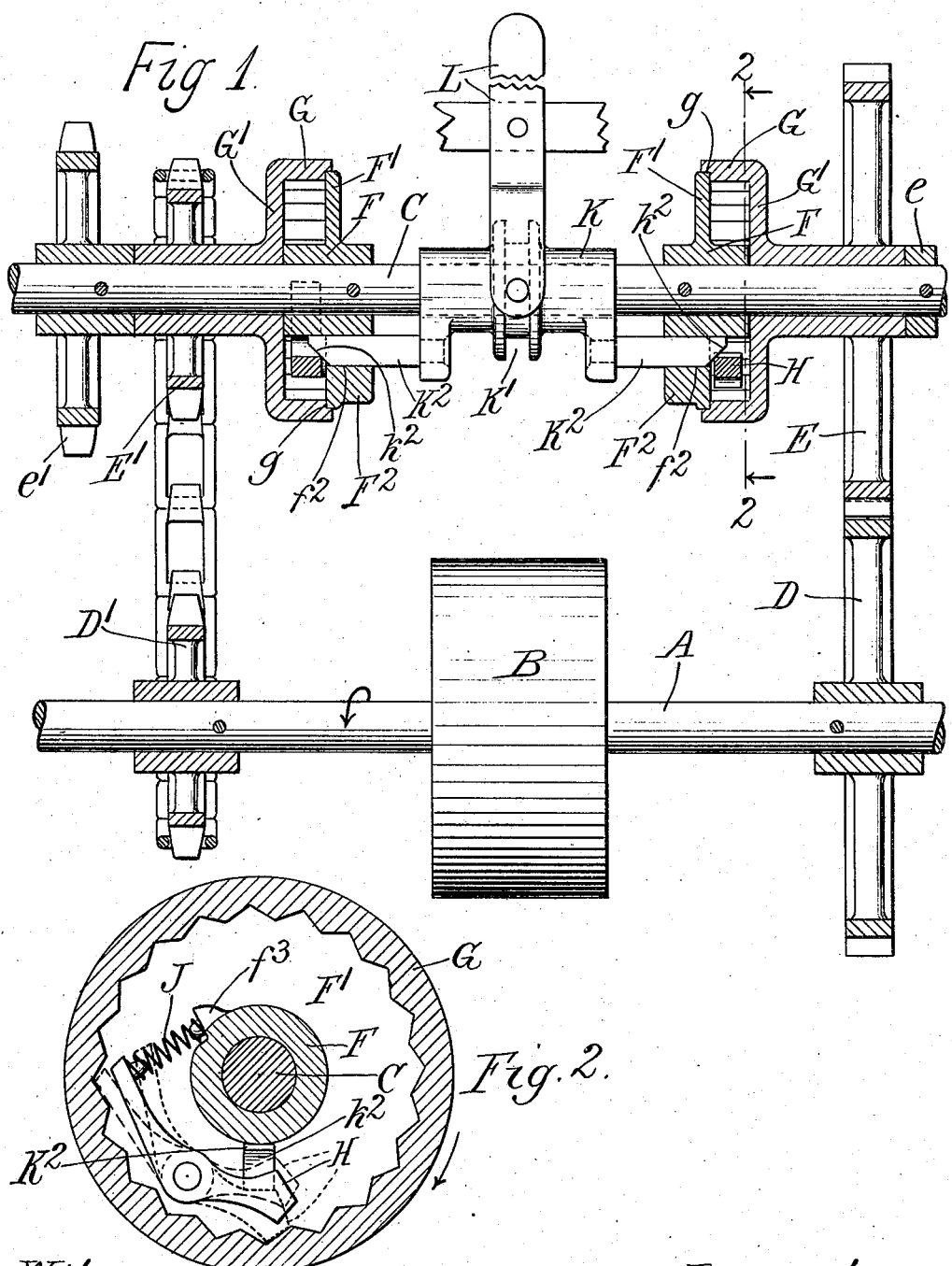

JOSEPH BODA, OF PLANO, ILLINOIS, ASSIGNOR TO THE INDEPENDENT HARVESTER COMPANY, OF PLANO, ILLINOIS, A CORPORATION OF MAINE.

CLUTCH MECHANISM.

942,244.

Specification of Letters Patent.

Patented Dec. 7, 1909.

Application filed June 15, 1908. Serial No. 438,464.

*To all whom it may concern:*

Be it known that I, JOSEPH BODA, a citizen of the United States, residing at Plano, in the county of Kendall and State of Illinois, have invented new and useful Improvements in Clutch Mechanism, of which the following is a specification, reference being had to the drawings forming a part thereof.

The purpose of this invention is to provide an improved clutching mechanism for transmitting rotary movement. It is especially designed for use in a train of mechanism in which the shaft is to be driven alternatively in opposite directions by being clutched alternatively by one or the other of two oppositely rotating elements in which it is associated.

It consists of the features of construction shown and described as indicated in the claims.

In the drawings:—Figure 1 is a section axial with respect to the two shafts of the train in which the clutch mechanism constituting this invention is embodied. Fig. 2 is a section at the line 2—2 on Fig. 1.

For convenience of presenting this invention in a compact form, it is shown as applied to power-communicating trains in which an initial shaft, A, may be understood as continuously driven in one direction from any source of power, as by a belt passing over the pulley, B, fixed on the shaft. Such shaft is shown communicating power to a driven shaft, C, for rotating the latter shaft in one direction or the other, according as the power is communicated through a train comprising, for illustration merely, gear wheels, D and E, on the two shafts respectively, or chain-connected sprocket wheels, D¹, E¹, on the two shafts respectively, the intermeshing gear wheels transmitting motion reversed and the sprocket wheels transmitting it unreversed. The operation of the clutch devices would obviously be the same if the direction of transmission were from the shaft, C, to the shaft, A. On the shaft, C, the wheels, E and E¹, are loose, being longitudinally stopped on the shaft, the wheel, E, being stopped in one direction by a collar, $e$, and in the other direction by the clutch collar, F, of one of the clutch devices hereinafter described, the wheel, E¹, being stopped in one direction by the sprocket wheel, $e^1$, which represents any means of transmitting power from the shaft, C, for the work to be done, and in the other direction by the clutch collar, F, of the other clutch device.

The two clutch devices on the shaft, C, which comprise the collars, F, are entirely similar, and the description of one will suffice for both. The clutch collar, F, is pinned fast on the shaft, C, and comprises a disk flange, F¹, springing from its hub intermediate its ends, and at one side of the axis and one side of the disk the boss, F², through which extends an aperture, $f^2$, parallel to the axis. Rigid with the power-communicating wheel, whether E or E¹, there is an interiorly ratcheted annular flange, G, which, for convenience of illustration, is shown as jointed with the wheel by a web, G¹, extending to the hub of the wheel, but the particular mode of rigid connection between the ratcheted annular flange, G, and the wheel is not material. The disk flange, F¹, fits in the edge of the annular flange, G, which is rabbeted at $g$ for seating said disk flange, F¹. On the inner face of said disk flange, F¹, there is pivoted intermediate its ends a dog, H, adapted to engage the ratchet notches or teeth of the ratchet flange, G, either by its head or by its tail end, according as it is rocked in one direction or the other about its pivot, and the spring, J, is interposed between said dog at the side of its fulcrum toward the tail end and an abutting tooth or shoulder, $f^3$, which projects from the hub of the clutch collar, F, the spring thus operating to hold the tail end of the dog normally engaged with the ratchet teeth and the head end disengaged therefrom.

On the shaft, C, between the two clutch devices, there is mounted loose a sliding shipping sleeve, K, provided intermediate its ends with an annular groove, K¹, adapted for engagement of a shipping lever, L. From each end of the sleeve at one side of the axis a rigid finger, K², projects parallel to the axis toward the adjacent clutch collar, F, and extends into the aperture, $f^2$, thereof, said finger being of suitable length to extend entirely through said aperture. The end of the finger is beveled at the outer side, as seen at $k^2$, and the position of the operator with respect to the pivot of the dog, H, is such that this beveled end of the finger, K², when the finger is thrust through the aperture encounters the inner side of the dog near the head end and crowds that end of the dog out into engagement with the ratchet teeth, disengaging the tail end at the same time. If the sleeve is caused to slide on the shaft far enough to thrust the finger, $K^2$, to the limit to which it can be moved,— that is, until the end encounters the web, $G^1$,—the head of the dog is thereby crowded fully into engagement with the ratchet. If, however, it is thrust only part way, the action of the beveled end, $k^2$, of the finger, $K^2$, will be to rock the dog on its pivot only far enough to disengage the tail end from the ratchet without engaging the head end therewith.

The entire length of the shipping collar, K, with its projecting fingers, $K^2$,—that is, the distance from end to end of the two fingers,—is such with respect to the distance on the shaft, C, between the planes of the two dogs, H, H, that at the middle position of said shipping sleeve the beveled ends of both the fingers $K^2$, are in engagement with their respective dogs and are protruded far enough in such engagement to hold both the dogs disengaged at both ends from their respective ratchets. By shifting the clutch sleeve to one limit or the other of the range of movement which can be obtained, one of the dogs will be engaged by its head end and the other by its tail end with the ratchet. The two clutch devices being perfectly similar but facing oppositely on the shaft, the engagement of the heads of the dogs with their respective ratchets causes them to transmit rotary movement in opposite directions, corresponding, therefore, to the opposite directions of rotation of the two shafts, E and $E^1$, with which they are respectively connected.

Suitable means, not shown, will be employed to operate the shipping lever and hold it in any one of the three positions in which it may be adjusted: to wit, (1) the middle position at which both the dogs are disengaged from the ratchets and the shaft, C, is free to be turned in any direction by hand regardless of the driving train; (2) at one end of its throw on the shaft for effecting engagement of the clutch device at that side to drive the shaft from the wheel at that side, as, for example, $E^1$; (3) at the other end of its throw on the shaft for similarly connecting the shaft with the wheel, E, for rotation in the opposite direction. In each of the positions at which one dog is given driving engagement, the dog of the opposite clutch device whose head is not engaged with the ratchet for driving has its tail engaged with the ratchet for preventing reverse movement.

Since the spring, J, is relied upon to disengage the head of the dog, H, from its driving engagement with the ratchet shoulders of the ratchet flange, G, it is important that the friction caused at such driving engagement by the work done through such driving engagement should not be such as to materially resist or impede the action of the spring, since otherwise the disengagement would be delayed and uncertain. For this reason, the ratchet shoulders are formed so as to make an obtuse angle with a line drawn to them from the axis of the pivot of the dog, so that the head of the dog in swinging out of engagement does not slide at all upon the shoulder but withdraws from it from the very commencement of its disengaging movement. This relation of the parts substantially defeats any capacity of the dog for communicating or receiving driving action unless it is held positively in engagement with the ratchet shoulder, since otherwise it would be wedged out of engagement upon the first resistance due to the work. Such positive engagement of the dog with the ratchet shoulders it will be observed is effected by the finger, $K^2$, when thrust inward through the boss, $I^2$, for crowding the dog into engagement with the ratchet shoulders. The clutch thus constructed is, for the reasons explained, adapted to be promptly and unfailingly disengaged upon the withdrawal of the finger, $K^2$.

I claim:—

1. In combination with a shaft to or from which power is to be transmitted and a wheel loose for rotation on such shaft, a clutch collar fast on the shaft; a ratchet element rigid with the wheel; a dog pivotally mounted on the clutch collar having its opposite ends adapted and positioned for engaging the ratchet, one end at a time; a spring reacting on the dog for holding it normally engaged at one end with the ratchet; a shipping collar mounted for sliding on the shaft; a finger extending therefrom engaging the clutch collar and encountering the dog thereon, the end of the finger being beveled for such encounter to wedge the dog against the opposition of its spring and the dog being constructed for movement of its head bodily upon such encounter, the encountering parts of the finger and dog being unyielding with respect to the remainder of said elements for positively moving the dog into and holding it in engagement with the ratchet.

2. In combination with a shaft to or from which power is to be transmitted, two wheels loose for rotation on such shaft and means for communicating rotation in opposite directions to or from such wheels; ratchet elements rigid with the wheels respectively and facing each other; clutch collars fast on the shaft between the two ratchet elements and coöperating with them respectively; dogs pivoted on the clutch collars, each having its opposite ends adapted to be engaged one at a time with the cooperating ratchet and provided each with a spring for holding one end normally engaged with the ratchet; a shipping collar loose for sliding on the shaft between the two clutch collars; fingers projecting from the opposite ends of said shipping collar into engagement with the clutch collars respectively, said fingers being beveled for encounter with the clutch collars, respectively, toward which they are moved, the encountering parts of said fingers and dogs being unyielding with respect to the remainder of said elements respectively for positively wedging the encountered heads into engagement with the ratchets respectively.

3. In combination with a shaft to or from which power is to be transmitted and a wheel loose for rotation on such shaft, a clutch collar fast on the shaft; a ratchet element rigid with the wheel; a dog pivotally mounted on the clutch collar having its opposite ends adapted and positioned for engaging the ratchet one at a time; a spring reacting on the dog for holding its head normally engaged with the ratchet; a shipping collar mounted for sliding on the shaft; a finger extending therefrom engaging the clutch collar and encountering the dog thereon for rocking it positively about its pivot in opposition to its spring, the ratchet shoulders of the ratchet being sloped, so that at the position at which each is engaged with the head of the dog, it stands at an obtuse angle to any line from it to the axis of the pivot of the dog.

4. In combination with a shaft to or from which power is to be transmitted, and a wheel loose for rotation on such shaft, a clutch collar fast on the shaft; a ratchet element rigid with the wheel; a dog pivotally mounted on the clutch collar having its opposite ends adapted and positioned for engaging the ratchet, one end at a time; a spring operating on the dog for holding one end normally engaged with the ratchet; a collar mounted for sliding on the shaft; a finger extending therefrom encountering the dog on the clutch collar for rocking it about its pivot in opposition to its spring, the dog being constructed for movement as a rigid element throughout its entire extent from the point of encounter of the finger to and including the ratchet-engaged end.

5. In combination with a shaft to or from which power is to be transmitted and a wheel loose for rotation on such shaft, a clutch collar fast on the shaft; a ratchet element rigid with the wheel; a dog pivotally mounted on the clutch collar having its opposite ends adapted and positioned for engaging the ratchet, one end at a time; a spring operating on the dog for holding one end normally engaged with the ratchet; a collar mounted for sliding on the shaft; a finger extending therefrom encountering the dog on the clutch collar for rocking it about its pivot in opposition to its spring, the encountering parts of the finger and dog being unyielding with respect to the remainder of said elements for positive transmission of the movement of the one to the other, and positive holding of the encountered end of the dog in engagement with the ratchet.

In testimony whereof, I have hereunto set my hand at Chicago, Illinois, this 13th day of June, 1908.

JOSEPH BODA.

Witnesses:
M. GERTRUDE ADY,
J. S. ABBOTT.